United States Patent
Chen et al.

(10) Patent No.: US 9,389,726 B2
(45) Date of Patent: Jul. 12, 2016

(54) CLICK-EVENT DETECTION DEVICE

(75) Inventors: Hsin Chia Chen, Hsin-Chu (TW); Yu Hao Huang, Hsin-Chu (TW); Ren Hau Gu, Hsin-Chu (TW); Yi Fang Lee, Hsin-Chu (TW); Ming Tsan Kao, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 884 days.

(21) Appl. No.: 13/613,707

(22) Filed: Sep. 13, 2012

(65) Prior Publication Data

US 2013/0100023 A1 Apr. 25, 2013

(30) Foreign Application Priority Data

Oct. 25, 2011 (TW) ............................. 100138624 A (51) Int. Cl.
*G06F 3/041* (2006.01)
*G06F 3/042* (2006.01)

(52) U.S. Cl.
CPC ............ *G06F 3/0416* (2013.01); *G06F 3/0421* (2013.01)

(58) Field of Classification Search
CPC ... G06F 3/033; G06F 3/0317; G06F 3/03541; G06F 3/03543; G06F 3/0312; G06F 2203/0335; G06F 2203/0337; G06F 3/0416; G06F 3/0421
See application file for complete search history.

(56) References Cited

U.S. PATENT DOCUMENTS

| 2007/0132734 | A1  | 6/2007  | Kwak et al.         |         |
|--------------|-----|---------|---------------------|---------|
| 2008/0018612 | A1* | 1/2008  | Nakamura et al.     | 345/173 |
| 2010/0073327 | A1  | 3/2010  | Mau et al.          |         |
| 2010/0289745 | A1* | 11/2010 | Lye et al.          | 345/166 |
| 2011/0193778 | A1* | 8/2011  | Lee et al.          | 345/158 |
| 2013/0076693 | A1* | 3/2013  | Tan et al.          | 345/175 |

FOREIGN PATENT DOCUMENTS

| CN | 100547530 C | 10/2009 |
|----|-------------|---------|
| CN | 101783163 A | 7/2010  |

* cited by examiner

*Primary Examiner* — Aneeta Yodichkas
(74) *Attorney, Agent, or Firm* — Hauptman Ham, LLP (57) ABSTRACT

There is provided a click-event detection device including a light source, a light control unit, an image sensor and a processing unit. The light control unit is configured to control the light source to illuminate a finger. The image sensor receives reflected light from the finger to accordingly output a plurality of bright image frames and dark image frames. The processing unit is configured to calculate a differential image characteristic between the bright image frames and the dark image frames, to determine a plurality of operating states according to the differential image characteristic, to count a residence time at each of the operating states, and to identify a click-event according to the operating states and the residence time.

19 Claims, 5 Drawing Sheets

CLICK-EVENT DETECTION DEVICE

CROSS REFERENCE TO RELATED APPLICATION

This application claims the priority benefit of Taiwan Patent Application Serial Number 100138624, filed on Oct. 25, 2011, the full disclosure of which is incorporated herein by reference.

BACKGROUND

1. Field of the Disclosure

This disclosure generally relates to a human interface device and, more particularly, to a click-event detection device capable of eliminating interference from ambient light.

2. Description of the Related Art

Portable electronic devices are popular nowadays for their excellent operating convenience. Most portable electronic devices provide a display screen for a user to watch the operating states thereof and a peripheral device, e.g. an optical finger mouse, for the user to perform the cursor control or to select an application program to be executed.

Figure 1:
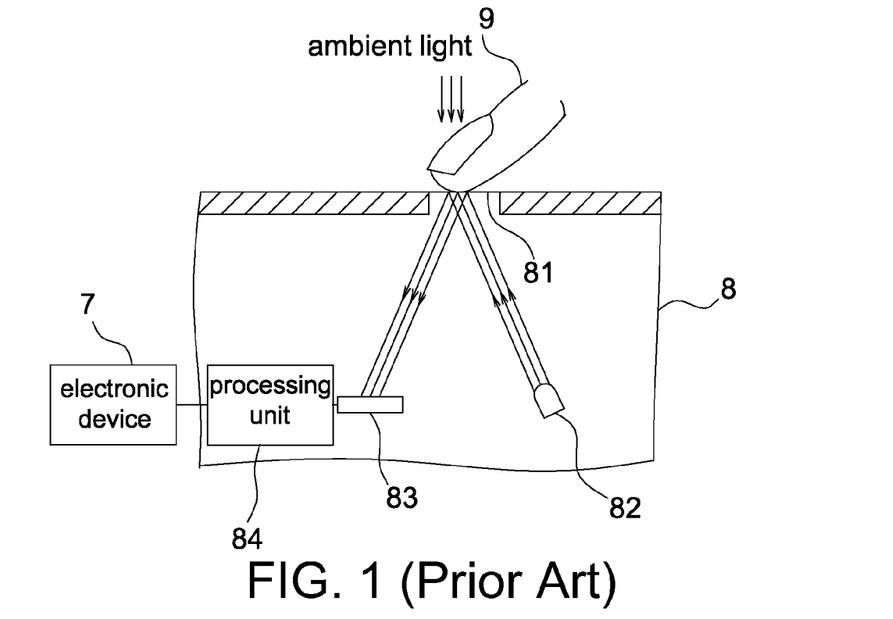
FIG. 1 shows a schematic diagram of a conventional optical finger mouse.

Please refer to FIG. 1, it shows a schematic diagram of a conventional optical finger mouse 8 which includes a control surface 81, a light source 82, an image sensor 83 and a processing unit 84. The finger 9 of a user is operated on the control surface 81 in order to correspondingly control an electronic device 7 coupled to the optical finger mouse 8. The light source 82 is configured to provide light to the control surface 81. When the finger 9 contacts the control surface 81, it can reflect the light irradiated from the light source 82. The image sensor 83 receives reflected light from the finger 9 to accordingly output a plurality of image frames. The processing unit 84 calculates a contact status of the finger 9 according to the image frames so as to control the electronic device 7.

However, as the control surface 81 can be made of material that is transparent to the light of a predetermined spectrum, not only the light irradiated from the light source 82 but ambient light, within the predetermined spectrum, outside the optical finger mouse 8 can penetrate the control surface 81 and be detected by the image sensor 83. The image frames outputted from the image sensor 83 can be interfered to degrade the image quality thereof such that the calculation accuracy of the processing unit 84 is degraded.

Accordingly, the present disclosure provides a click-event detection device capable of eliminating interference from ambient light thereby effectively improving the identification accuracy.

SUMMARY

It is an object of the present disclosure to provide a click-event detection device capable of eliminating interference from ambient light and is configured to detect a click-event of a finger.

The present disclosure provides a click-event detection device including a light source, a light control unit, an image sensor and a processing unit. The light source is configured to illuminate a finger. The light control unit is configured to control the light source to illuminate with a first brightness value and a second brightness value. The image sensor is configured to receive reflected light from the finger at a sampling frequency to output bright image frames corresponding to the first brightness value and to output dark image frames corresponding to the second brightness value. The processing unit is configured to calculate a plurality of differential image characteristics according to the bright image frames and the dark image frames, to determine a plurality of operating states according to the differential image characteristics, to count a residence time at each of the operating states, and to identify a click-event according to the operating states and the residence time.

In an aspect, the processing unit further calculates a displacement according to the bright image frames and identifies the click-event according to the operating states, the residence time and the displacement.

The present disclosure further provides a click-event detection device including a light source, a light control unit, an image sensor and a processing unit. The light source is configured to illuminate a finger. The light control unit is configured to control the light source to illuminate with a first brightness value and a second brightness value. The image sensor is configured to receive reflected light from the finger at a sampling frequency to output bright image frames corresponding to the first brightness value and to output dark image frames corresponding to the second brightness value. The processing unit is configured to calculate a plurality of differential image characteristics according to the bright image frames and the dark image frames, wherein the processing unit identifies a single-click when following two conditions are satisfied sequentially: (1) a first variation of the differential image characteristics is larger than a first varying threshold within a first time interval; and then (2) a second variation of the differential image characteristics is smaller than or equal to a second varying threshold within a second time interval.

The present disclosure further provides a click-event detection device including a light source, a light control unit, an image sensor and a processing unit. The light source is configured to illuminate a finger. The light control unit is configured to control the light source to illuminate with a first brightness value and a second brightness value. The image sensor is configured to receive reflected light from the finger at a sampling frequency to output bright image frames corresponding to the first brightness value and to output dark image frames corresponding to the second brightness value. The processing unit is configured to calculate a plurality of differential image characteristics according to the bright image frames and the dark image frames, wherein the processing unit identifies a single-click when following two conditions are satisfied sequentially: (1) a first value of the differential image characteristics is larger than a first threshold within a first time interval; and then (2) a second value of the differential image characteristics is smaller than or equal to a second threshold within a second time interval.

In the click-event detection device of the present disclosure, the differential image characteristic is an average brightness difference, an image quality difference, a normalized average brightness difference or a normalized image quality difference between one of the bright image frames and one of the dark image frames; wherein the normalized average brightness difference is obtained by normalizing the average brightness difference with a sampling parameter, and the normalized image quality difference is obtained by normalizing the image quality difference with the sampling parameter. The sampling parameter may be at least one of an exposure time and an image gain.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 2:
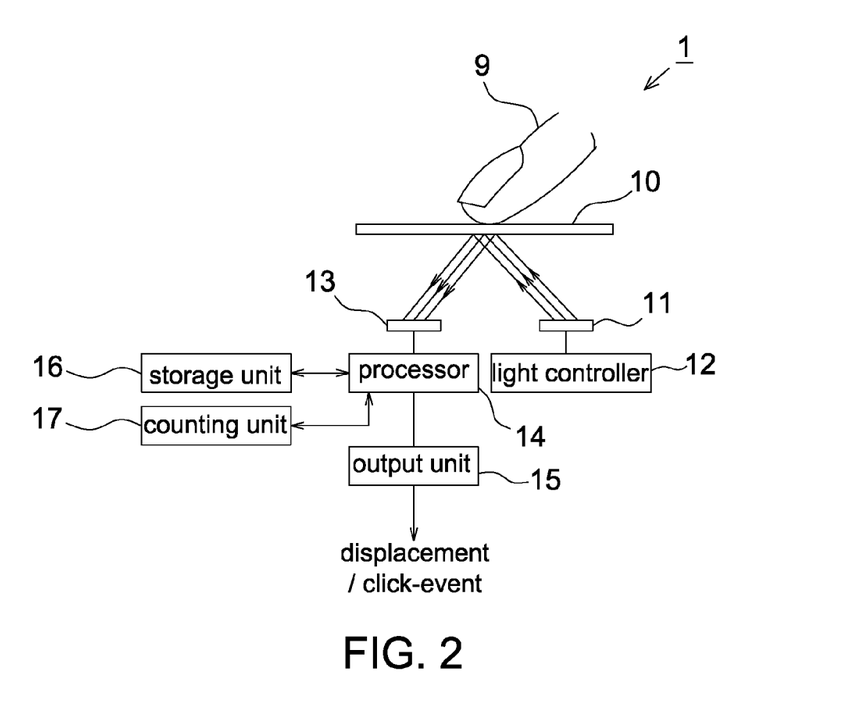
FIG. 2 shows a schematic diagram of the click-event detection device according to an embodiment of the present disclosure.

Please refer to FIG. 2, it shows a schematic diagram of the click-event detection device 1 according to an embodiment of the present disclosure. The click-event detection device 1 includes a touch surface 10, a light source 11, a light control unit 12, an image sensor 13, a processing unit 14, an output unit 15, a storage unit 16 and a counting unit 17.

The touch surface 10 is configured to provide a control interface on which a finger 9 may perform a click operation (e.g. a single-click or double-click) or a moving operation. The light source 1 may irradiate light of a proper spectrum such as invisible light or infrared light, and may be one or a plurality of light emitting diodes, laser diodes or other active light sources configured to provide light to the touch surface 10. When the finger 9 approaches or contacts the touch surface 10, the finger 9 reflects the light irradiated from the light source 11. Therefore, the touch surface 10 is preferably transparent to the light irradiated by the light source 11. The light control unit 12 is configured to control the light source 11 to illuminate with different brightness values at predetermined times. The image sensor 13 may be a CCD image sensor, a CMOS image senor or the like and is configured to receive reflected light from the touch surface 10 (more specifically the finger 9) at a sampling frequency and with a sampling parameter so as to successively output image frames, wherein the sampling frequency may be adjusted according to a moving speed of the finger 9, and the sampling parameter may include, for example, an exposure time and an image gain.

Figure 3:
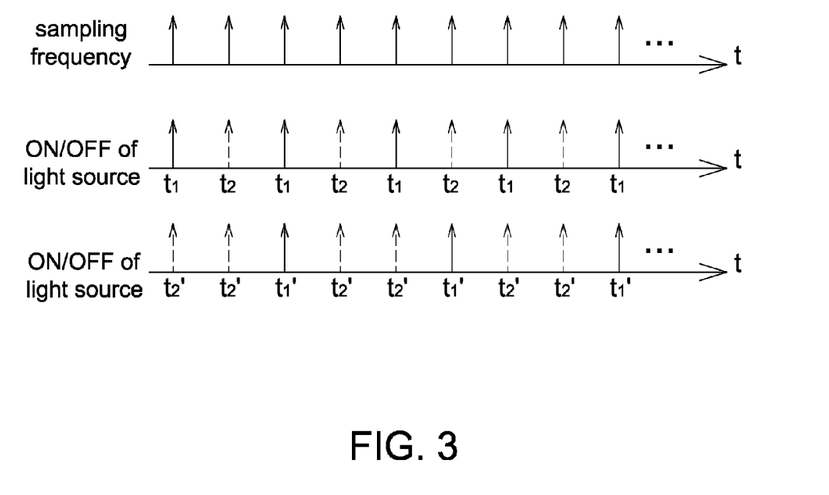
FIG. 3 shows a schematic diagram of the sampling frequency and the operation of the light source in the click-event detection device according to the embodiment of the present disclosure.

Please refer to FIG. 3, it shows a schematic diagram of the sampling frequency of the image sensor 13 and the operation of the light source 11 in the click-event detection device 1 according to the embodiment of the present disclosure, wherein the image sensor 13 acquires image frames at a sampling frequency, and the light control unit 12 controls the light source 11 to turn on at times $t_1$ and $t_1'$ (shown as solid arrows) and to turn off at times $t_2$ and $t_2'$ (shown as broken arrows). In this manner, the image sensor 13 acquires and outputs bright image frames corresponding to the times $t_1$ and $t_1'$, and acquires and outputs dark image frames corresponding to the times $t_2$ and $t_2'$, wherein the acquired dark image frames herein are used to eliminate interference from ambient light. For example, when the finger 9 approaches the touch surface 10, the bright image frames acquired by the image sensor 13 contain the information of (reflected light from finger+stray light+ambient light), and the dark image frames only contain the information of (ambient light). When the finger 9 does not approach the touch surface 10, the bright image frames acquired by the image sensor 13 contain the information of (stray light+ambient light), and the dark image frames only contain the information of (ambient light). Therefore, the interference from ambient light can be eliminated by calculating the differential image between the bright image frames and the dark image frames.

It should be mentioned that the light control unit 12 is not only configured to control ON/OFF of the light source 11, the light control unit 12 may also control the light source 11 to illuminate with a first brightness value at, for example, the times $t_1$ and $t_1'$, and to illuminate with a second brightness value at, for example, the times $t_2$ and $t_2'$, wherein when the first brightness value is larger than the second brightness value, the image sensor 13 may acquire brighter image frames corresponding to the first brightness value and acquire darker image frames corresponding to the second brightness value. Therefore, the image sensor 13 may acquire bright image frames at the times $t_1$ and $t_1'$, and acquire dark image frames at the times $t_2$ and $t_2'$; that is, the dark image frames herein are referred to the image frames having a lower brightness and may not be necessarily acquired when the light source 11 is turned off. In this manner, the interference from ambient light can also be eliminated by calculating the differential image between the bright image frames and the dark image frames. In other words, in this embodiment the second brightness value may have a zero or a non-zero brightness value. In addition, FIG. 3 only shows an example that the light control unit 12 controls the light source 11 to turn on or turn off, and the light control unit 12 may also control the light source 11 to operate in other ways as long as the image sensor 13 is able to acquire bright and dark image frames for the calculation of the differential images.

The processing unit 14 receives the bright an dark image frames outputted by the image sensor 13 and calculates differential images therebetween, and calculates a differential image characteristic or a normalized differential image characteristic of the differential images, calculates a displacement of the finger 9 according to the bright image frames, determines a plurality of operating states of the finger 9 according to the differential image characteristic (described later), counts a residence time at each of the operating states, and identifies a click-event (e.g. a single-click or a double-click) according to the operating states, the residence time and the displacement, wherein the image characteristic referred herein may be an average brightness or an image quality of the bright and dark image frames, and the image characteristic may be represented by a numerical value. It is appreciated that the processing unit 14 may first calculate respective image characteristics of the bright image frames and the dark image frames, and then calculate the differential image characteristic according to the image characteristic of the bright image frames and the image characteristic of the dark image frames.

The normalized image characteristic is obtained by normalizing the image characteristic with a sampling parameter including, for example, an exposure time and/or an image gain. The reason of performing the normalization is that the image sensor 13 may acquire image frames using different sampling parameters under different conditions, and thus the acquired image frames may be normalized to improve the stability of the image characteristic so as to reduce the variance of the image data used in calculating displacement and in detecting click-event. Therefore in this embodiment, the differential image characteristic may be obtained by $$DFA=FA^{ON}-FA^{OFF} \quad (1),$$

wherein DFA denotes an average brightness difference; $FA^{ON}$ denotes an average brightness of the bright image frames; $FA^{OFF}$ denotes an average brightness of the dark image frames; or by $$DIQ=IQ^{ON}-IQ^{OFF} \quad (2),$$

wherein DIQ denotes an image quality difference; $IQ^{ON}$ denotes an image quality of the bright image frames; $IQ^{OFF}$ denotes an image quality of the dark image frames.

The normalized differential image characteristic may be obtained by $$NDFA=(FA^{ON}-FA^{OFF})/(ET^{ON} \times IG^{ON}) \quad (3),$$

wherein NDFA denotes a normalized average brightness difference; $ET^{ON}$ denotes an exposure time corresponding to the bright image frames; $IG^{ON}$ denotes an image gain of the bright image frames (e.g. an analog or a digital gain); or by $$NDIQ=(IQ^{ON}-IQ^{OFF})/(ET^{ON} \times IG^{ON}) \quad (4),$$

wherein NDIQ denotes a normalized image quality difference. It should be mentioned that in the descriptions of this disclosure, the image characteristic and the normalized image characteristic of the differential images may both be represented by the term "differential image characteristic or DIC"; i.e. the differential image characteristic used in this disclosure may be a normalized or a non-normalized image characteristic of the differential images.

The processing unit 14 may further calculate a displacement of the finger 9 according to the bright image frames, e.g. the displacement may be calculated according to the correlation between two bright image frames or according to other conventional methods, and the dark image frames will not be used to calculate the displacement. In this embodiment, the displacement obtained is used to make sure that the user is not performing an operation that is not a click operation (e.g. a transverse moving operation) during detecting a click-event. Therefore, when the displacement (more specifically a transverse displacement) exceeds a predetermined range, the detection of the click-event is ended. In other embodiments, the displacement may not be included as one of the judgment conditions for identifying a click-event.

Figure 4:
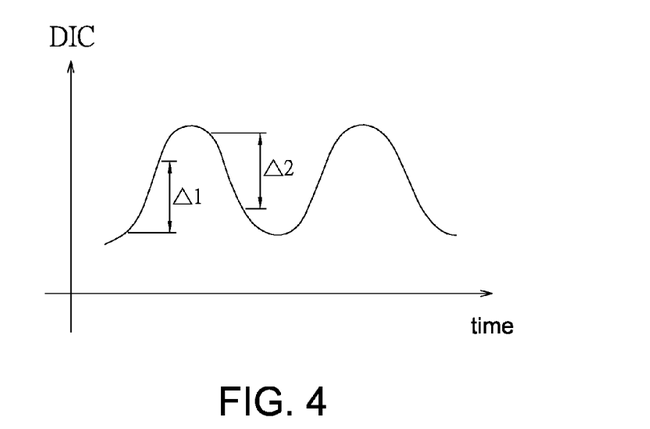
FIG. 4 shows a schematic diagram of the variation of the differential image characteristic with respect to time in the click-event detection device according to the embodiment of the present disclosure.

The processing unit 14 further identifies a plurality of operating states (or a change of the operating state) of the finger 9 according to the differential image characteristic. Please refer to FIG. 4, it shows a schematic diagram of the variation of the differential image characteristic with respect to time obtained by the processing unit 14 in the click-event detection device 1 according to the embodiment of the present disclosure, wherein when the finger 9 gradually approaches the touch surface 10, a value of the differential image characteristic monotonically increases; on the contrary, when the finger 9 gradually leaves the touch surface 10, the value of the differential image characteristic monotonically decreases. It is appreciated that a relationship between the increasing and decreasing of said value of the differential image characteristic with respect to the approaching or leaving of the finger 9 is not limited to that shown in FIG. 4.

Figure 5A:
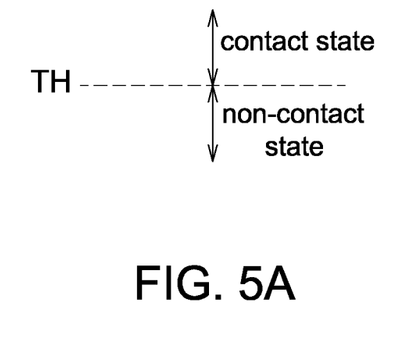
FIGS. 5A-5C show schematic diagrams of identifying the finger state in the click-event detection device according to the embodiment of the present disclosure.
Figure 5B:
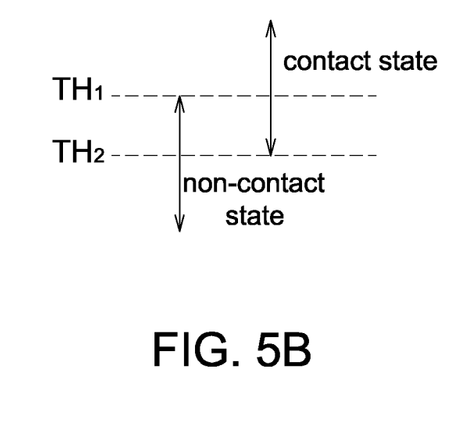
Figure 5C:
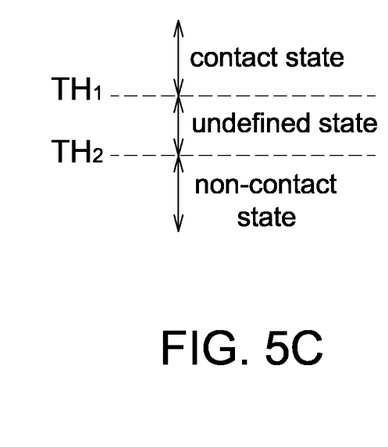

Please refer to FIGS. 5A to 5C, they show schematic diagrams of identifying the operating states of the finger 9 by the processing unit 14 in the present disclosure. In FIG. 5A, a threshold TH is previously stored in the storage unit 16, and the processing unit 14 compares a value of the obtained differential image characteristic with the threshold TH so as to identify the operating state; for example, when the value of the differential image characteristic is larger than the threshold TH, a contact state is identified; on the contrary, a non-contact state is identified. In addition, in order to prevent a frequent change of the operating state due to the value of the differential image characteristic too close to the threshold TH, two different thresholds $TH_1$ and $TH_2$ (e.g. $TH_1 > TH_2$) may be previously stored in the storage unit 16. For example, FIG. 5B shows a two-state embodiment. In non-contact state, if the value of the differential image characteristic is larger than the first threshold $TH_1$, change to the contact state; in the contact-state, if the value of the differential image characteristic is smaller than or equal to the second threshold $TH_2$, change to the non-contact state. In this way, the system stability can be improved. For example FIG. 5C shows a three-state embodiment, the processing unit 14 directly compares the value of the differential image characteristic with two thresholds so as to determine a current operating state. When the value of the differential image characteristic is larger than the first threshold $TH_1$, a contact state is identified; when the value of the differential image characteristic is between the first threshold $TH_1$ and the second threshold $TH_2$, an undefined state is identified; and when the value of the differential image characteristic is smaller than the second threshold $TH_2$, a non-contact state is identified. In FIGS. 5A to 5C, the processing unit 14 has to compare the value of the differential image characteristic itself with at least one fixed threshold. It is appreciated that the selection of the threshold may be different according to different applications, e.g. it may be determined according to the identification sensitivity, but not limited thereto.

Please refer to FIG. 4 again, the processing unit 14 may not compare the value of the differential image characteristic itself with the fixed threshold but calculate a variation of the differential image characteristic so as to determine whether an operating state change occurs. For example, when the value of the differential image characteristic gradually increases and a variation thereof (e.g. an absolute value of the variation) is larger than a first varying threshold $\Delta 1$, the operating state change is identified (e.g. changing from a first state to a second state); and when the value of the differential image characteristic gradually decreases and a variation thereof (e.g. an absolute value of the variation) is larger than a second varying threshold $\Delta 2$, the operating state change is identified (e.g. changing from a second state to a first state). In this embodiment, only the operating state change will be identified but a contact state or a non-contact state will never be identified. Therefore, the operating state change may not occur at fixed values of the differential image characteristic, wherein the variation used herein may be a changing ratio, e.g. 80% or 120%, of the value of the differential image characteristic. Therefore, the change of the operating state may be adaptively adjusted according to different fingers of different individuals. The counting unit 17 is configured to count (or timing) a residence time at each of the operating states.

The processing unit 14 may then identify a click-event of the finger 9 according to the operating states, the residence time and/or the displacement. Please refer to FIG. 6, it shows a flow chart of identifying a single-click in the click-event detection device 1 according to the embodiment of the present disclosure, which includes the steps of: counting a residence time $T_1$ at a first state (Step $S_{11}$); identifying whether a differential image characteristic is larger than a first threshold $TH_1$; if yes, enter a second state; if no, return to the first state and re-execute the step $S_{11}$ (Step $S_{12}$); counting a residence time $T_2$ at the second state and calculating a displacement $D_1$ (Step $S_{13}$); identifying whether the differential image characteristic is smaller than or equal to a second threshold $TH_2$ (Step $S_{14}$); if yes, identifying a single-click according to the residence times $T_1$, $T_2$ and/or the displacement $D_1$ (Step $S_{15}$); if no, return to the second state and re-execute the step $S_{13}$. It is appreciated that in other embodiments the displacement $D_1$ may not be included as one of the judgment conditions in the Step $S_{15}$.

Figure 6:
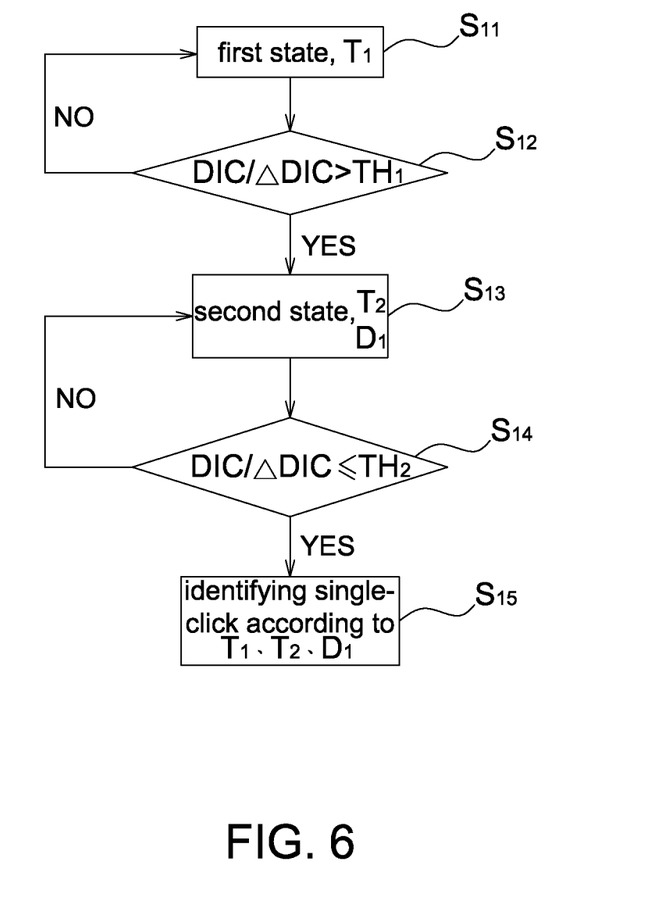
FIG. 6 shows a flow chart of identifying a single-click in the click-event detection device according to the embodiment of the present disclosure.

In one embodiment, the first state may be a non-contact state and the second state may be a contact state, and the processing unit 14 may compare a value of the differential image characteristic with a first threshold $TH_1$ and a second threshold $TH_2$. In the non-contact state (i.e. the first state), the counting unit 17 counts a residence time $T_1$ (Step $S_{11}$); when the value of the differential image characteristic is larger than the first threshold $TH_1$, enter the contact state (Step $S_{12}$). In the contact state (i.e. the second state), the processing unit 14 calculates a displacement $D_1$ according to bright image frames and the counting unit 17 counts a residence time $T_2$ (Step $S_{13}$); when the value of the differential image characteristic is smaller than or equal to the second threshold $TH_2$, perform the identification of the click-event (Step $S_{14}$). The processing unit 14 identifies whether a single-click occurs according to the residence times $T_1$, $T_2$ and/or the displacement $D_1$ (Step $S_{15}$); wherein the residence times $T_1$, $T_2$ have to be within a predetermined time interval and the displacement $D_1$ has to be smaller than a predetermined value. Finally, return to the Step $S_{11}$ for the next detection.

In another embodiment, the processing unit 14 may compare a variation of the differential image characteristic with a first varying threshold $TH_1$ and a second varying threshold $TH_2$, and the identification method is similar to the previous paragraph but is different in that the processing unit 14 compares the variation of the differential image characteristic with at least one varying threshold rather than compares the value of the differential image characteristic itself with fixed threshold, and the processing unit 14 does not define the operating state as a contact state or a non-contact state.

Therefore, in this embodiment a single-click may be identified when the following two conditions are satisfied sequentially: (1) In a first time interval $T_1$, a first variation (e.g. a positive variation) of the differential image characteristic is larger than a first varying threshold $TH_1$; (2) and then in a second time interval $T_2$, a second variation (e.g. a negative variation) of the differential image characteristic is smaller than or equal to a second varying threshold $TH_2$. The processing unit 14 then identifies that a single-click occurs, wherein the processing unit 14 may further calculate a displacement according to bright image frames in the second time interval $T_2$ and identify the single-click according to the counting value and displacement. In one embodiment, the first varying threshold is a positive value and the second varying threshold is a negative value. In other embodiments, it is able to compare an absolute value of the variation of the differential image characteristic with at least one varying threshold. In another embodiment a single-click may be identified when the following two conditions are satisfied sequentially: (1) In a first time interval $T_1$, a first value of the differential image characteristic is larger than a first threshold $TH_1$; (2) and then in a second time interval $T_2$, a second value of the differential image characteristic is smaller than or equal to a second threshold $TH_2$. The processing unit 14 then identifies that a single-click occurs.

Figure 7:
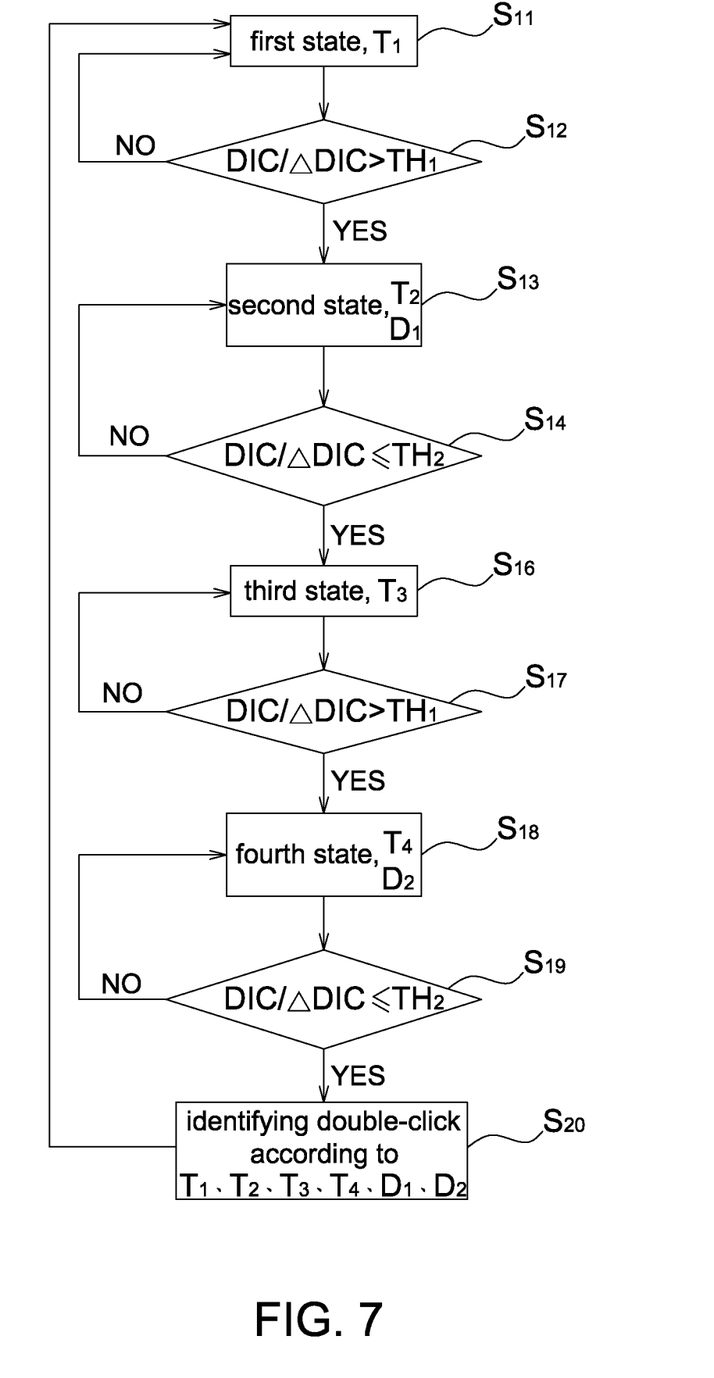
FIG. 7 shows a flow chart of identifying a double-click in the click-event detection device according to the embodiment of the present disclosure.

Please refer to FIG. 7, it shows a flow chart of identifying a double-click in the click-event detection device 1 according to the embodiment of the present disclosure, which includes the steps of: counting a residence time $T_1$ at a first state (Step $S_{11}$); identifying whether a differential image characteristic is larger than a first threshold $TH_1$; if yes, enter a second state; if no, return to the first state and re-execute the step $S_{11}$ (Step $S_{12}$); counting a residence time $T_2$ at the second state and calculating a displacement $D_1$ (Step $S_{13}$); identifying whether the differential image characteristic is smaller than or equal to a second threshold $TH_2$ (Step $S_{14}$); if yes, enter a third state; if no, return to the second state and re-execute the step $S_{13}$; counting a residence time $T_3$ at a third state (Step $S_{16}$); identifying whether the differential image characteristic is larger than the first threshold $TH_1$ (Step $S_{17}$); if yes, enter a fourth state; if no, return to the third state and re-execute the step $S_{16}$; counting a residence time $T_4$ at the fourth state and calculating a displacement $D_2$ (Step $S_{18}$); identifying whether the differential image characteristic is smaller than or equal to the second threshold $TH_2$ (Step $S_{19}$); if yes, identifying a double-click according to the residence times $T_1$ to $T_4$ and/or the displacements $D_1$, $D_2$ (Step $S_{20}$); if no, return to the fourth state and re-execute the step $S_{18}$. It is appreciated that in other embodiments the displacements $D_1$, $D_2$ may not be included as the judgment conditions in the Step $S_{20}$.

In one embodiment, the first and third states may be non-contact states and the second and fourth states may be contact states, and the processing unit 14 may compare a value of the differential image characteristic with a first threshold $TH_1$ and a second threshold $TH_2$; wherein the Steps $S_{11}$ to $S_{14}$ in this embodiment are identical to the steps of identifying the single-click as shown in FIG. 6, and thus details thereof will not be repeated herein. In the non-contact state (i.e. the third state), the counting unit 17 counts a residence time $T_3$ (Step $S_{16}$); when the value of the differential image characteristic is larger than the first threshold $TH_1$, enter the contact state (Step $S_{17}$). In the contact state (i.e. the fourth state), the processing unit 14 calculates a displacement $D_2$ according to bright image frames and the counting unit 17 counts a residence time $T_4$ (Step $S_{18}$); when the value of the differential image characteristic is smaller than or equal to the second threshold $TH_2$, perform the identification of the click-event (Step $S_{19}$). The processing unit 14 identifies whether a double-click occurs according to the residence times $T_1$ to $T_4$ and/or the displacements $D_1$, $D_2$ (Step $S_{20}$); wherein the residence times $T_1$ to $T_4$ have to be within a predetermined time interval and the displacements $D_1$, $D_2$ have to be smaller than a predetermined value. Finally, return to the Step $S_{11}$ for the next detection.

In another embodiment, the processing unit 14 may compare a variation of the differential image characteristic with a first varying threshold $TH_1$ and a second varying threshold $TH_2$, and the identification method is similar to the previous paragraph but is different in that the processing unit 14 compares the variation of the differential image characteristic with at least one varying threshold rather than compares the value of the differential image characteristic itself with fixed threshold, and the processing unit 14 does not define the operating state as a contact state or a non-contact state.

Therefore, in this embodiment a double-click may be identified when the following four conditions are satisfied sequentially: (1) In a first time interval $T_1$, a first variation of the differential image characteristic is larger than a first varying threshold $TH_1$; (2) then in a second time interval $T_2$, a second variation of the differential image characteristic is smaller than or equal to a second varying threshold $TH_2$; (3) then in a third time interval $T_3$, a third variation of the differential image characteristic is larger than the first varying threshold $TH_1$; (4) and then in a fourth time interval $T_4$, a fourth variation of the differential image characteristic is smaller than or equal to the second varying threshold $TH_2$. The processing unit 14 then identifies that a double-click occurs, wherein the processing unit 14 may further calculate a displacement according to bright image frames in the second time interval $T_2$ and the fourth time interval $T_4$, and identify the double-click according to the counting value and displacement. In another embodiment a double-click may be identified when the following four conditions are satisfied sequentially: (1) In a first time interval $T_1$, a first value of the differential image characteristic is larger than a first threshold $TH_1$; (2) then in a second time interval $T_2$, a second value of the differential image characteristic is smaller than or equal to a second threshold $TH_2$; (3) then in a third time interval $T_3$, a third value of the differential image characteristic is larger than the first threshold $TH_1$; (4) and then in a fourth time interval $T_4$, a fourth value of the differential image characteristic is smaller than or equal to the second threshold $TH_2$. The processing unit 14 then identifies that a double-click occurs.

Although only single-click and double-click events are illustrated in the present disclosure, a similar method can also be used to identify the multiple-click event. In addition, in the present disclosure the first threshold may be equal to or different from the second threshold; and the first varying threshold may be equal to or different from the second varying threshold.

The output unit 15 may be, for example, a transmission interface unit configured to wiredly or wirelessly transmit the click-event and/or the displacement obtained by the processing unit 14 to a corresponding electronic device. The storage unit 16 is coupled to the processing unit 14 configured to store at least one threshold (or varying threshold) for identifying the operating state and other parameters used in the calculation; for example, but not limited to, temporarily storing a part of bright and/or dark image frames.

The counting unit 17 is configured to count (or timing) the residence time at each of the operating states; for example, $T_1$ and $T_2$ shown in FIG. 6 and $T_1$ to $T_4$ shown in FIG. 7. The counting unit 17 may also be incorporated inside the processing unit 14; that is, the processing unit 14 may also perform the counting (or timing) function.

As mentioned above, the conventional optical finger mouse is not able to eliminate the interference from ambient light such that errors may be introduced during operation. The present disclosure further provides a click-event detection device (FIG. 2) that is able to effectively eliminate the interference from ambient light thereby increasing the identification accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A click-event detection device, configured to detect a click-event of a finger, the click-event detection device comprising:
    a light source configured to illuminate the finger;
    a light control unit configured to control the light source to illuminate with a first brightness value and a second brightness value;
    an image sensor configured to receive reflected light from the finger at a sampling frequency to output bright image frames corresponding to the first brightness value and to output dark image frames corresponding to the second brightness value; and
    a processing unit configured to calculate a plurality of differential image characteristics according to the bright image frames and the dark image frames,
        wherein the processing unit is configured to identify a single-click when following two conditions are satisfied sequentially: (1) a first variation of the differential image characteristics is larger than a first varying threshold within a first time interval; and (2) a second variation of the differential image characteristics is smaller than or equal to a second varying threshold within a second time interval, and
        wherein the processing unit is configured to identify a double-click when following four conditions are satisfied sequentially: (1) the first variation of the differential image characteristics is larger than the first varying threshold within the first time interval; (2) the second variation of the differential image characteristics is smaller than or equal to the second varying threshold within the second time interval; (3) a third variation of the differential image characteristics is larger than the first varying threshold within a third time interval; and (4) a fourth variation of the differential image characteristics is smaller than or equal to the second varying threshold within a fourth time interval.

2. The click-event detection device as claimed in claim 1, wherein the first varying threshold is equal to or different from the second varying threshold.

3. The click-event detection device as claimed in claim 1, wherein
    the differential image characteristic is an average brightness difference, an image quality difference, a normalized average brightness difference or a normalized image quality difference between one of the bright image frames and one of the dark image frames; and
    the normalized average brightness difference is obtained by normalizing the average brightness difference with a sampling parameter, and the normalized image quality difference is obtained by normalizing the image quality difference with the sampling parameter.

4. The click-event detection device as claimed in claim 3, wherein the sampling parameter is at least one of an exposure time and an image gain.

5. The click-event detection device as claimed in claim 1, wherein the processing unit is further configured to
    calculate a displacement according to the bright image frames within the second time interval, and
    end the detection of the click-event when the displacement exceeds a predetermined range.

6. The click-event detection device as claimed in claim 1, wherein the processing unit is further configured to
    calculate a displacement according to the bright image frames within the second time interval and the fourth time interval, and
    end the detection of the click-event when the displacement exceeds a predetermined range.

7. The click-event detection device as claimed in claim 1, wherein the first brightness value is larger than the second brightness value.

8. The click-event detection device as claimed in claim 1, wherein the first variation is a positive variation and the second variation is a negative variation.

9. A click-event detection device, configured to detect a click-event of a finger, the click-event detection device comprising:
    a light source configured to illuminate the finger;

a light control unit configured to control the light source to illuminate with a first brightness value and a second brightness value;

an image sensor configured to receive reflected light from the finger at a sampling frequency to output bright image frames corresponding to the first brightness value and to output dark image frames corresponding to the second brightness value; and a processing unit configured to calculate a plurality of differential image characteristics according to the bright image frames and the dark image frames, wherein the processing unit is configured to identify a single-click when following two conditions are satisfied sequentially: (1) a first value of the differential image characteristics is larger than a first threshold within a first time interval; and (2) a second value of the differential image characteristics is smaller than or equal to a second threshold within a second time interval, and wherein the processing unit is configured to calculate a double-click when following four conditions are satisfied sequentially: (1) the first value of the differential image characteristics is larger than the first threshold within the first time interval; (2) the second value of the differential image characteristics is smaller than or equal to the second threshold within the second time interval; (3) a third value of the differential image characteristics is larger than the first threshold within a third time interval; and (4) a fourth value of the differential image characteristics is smaller than or equal to the second threshold with a fourth time interval.

10. The click-event detection device as claimed in claim 9 wherein the first threshold is equal to or different from the second threshold.

11. The click-event detection device as claimed in claim 9, wherein
the differential image characteristic is an average brightness difference, an image quality difference, a normalized average brightness difference or a normalized image quality difference between one of the bright image frames and one of the dark image frames; and
the normalized average brightness difference is obtained by normalizing the average brightness difference with a sampling parameter, and the normalized image quality difference is obtained by normalizing the image quality difference with the sampling parameter.

12. The click-event detection device as claimed in claim 11, wherein the sampling parameter is at least one of an exposure time and an image gain.

13. The click-event detection device as claimed in claim 9, wherein the processing unit is further configured to
calculate a displacement according to the bright image frames within the second time interval, and
end the detection of the click-event when the displacement exceeds a predetermined range.

14. The click-event detection device as claimed in claim 9, wherein the processing unit is further configured to
calculate a displacement according to the bright image frames within the second time interval and the fourth time interval, and
end the detection of the click-event when the displacement exceeds a predetermined range.

15. The click-event detection device as claimed in claim 9, wherein the first brightness value is larger than the second brightness value.

16. The click-event detection device as claimed in claim 9, wherein the first variation is a positive variation and the second variation is a negative variation.

17. A click-event detection device, configured to detect a click-event of a finger, the click-event detection device comprising:
a light source configured to illuminate the finger;
a light control unit configured to control the light source to illuminate with a first brightness value and a second brightness value;
an image sensor configured to receive reflected light from the finger to output bright image frames corresponding to the first brightness value and to output dark image frames corresponding to the second brightness value; and
a processing unit configured to calculate a plurality of differential image characteristics according to the bright image frames and the dark image frames,
wherein the processing unit is configured to identify a double-click when following four conditions are satisfied sequentially: (1) a first variation of the differential image characteristics is larger than a first varying threshold within a first time interval; (2) a second variation of the differential image characteristics is smaller than or equal to a second varying threshold within a second time interval; (3) a third variation of the differential image characteristics is larger than the first varying threshold within a third time interval; and (4) a fourth variation of the differential image characteristics is smaller than or equal to the second varying threshold within a fourth time interval.

18. The click-event detection device as claimed in claim 17, wherein the first brightness value is larger than the second brightness value.

19. The click-event detection device as claimed in claim 17, wherein the first variation is a positive variation and the second variation is a negative variation.

* * * * *